United States Patent [19]

Miura et al.

[11] Patent Number: 5,763,019
[45] Date of Patent: Jun. 9, 1998

[54] METHOD OF MANUFACTURING MAGNETIC RECORDING MEDIUM

[75] Inventors: Hiroki Miura; Masayasu Sato, both of Ichigai-machi, Japan

[73] Assignee: Kao Corporation, Tokyo, Japan

[21] Appl. No.: 746,413

[22] Filed: Nov. 12, 1996

[30] Foreign Application Priority Data

Feb. 13, 1996 [JP] Japan ................................. 8-048399
Jun. 14, 1996 [JP] Japan ................................. 8-174356

[51] Int. Cl.⁶ ..................................................... H01F 1/00
[52] U.S. Cl. ................. 427/549; 427/128; 427/130; 427/131; 427/385.5; 427/402; 427/443.2; 427/444; 427/550; 427/599
[58] Field of Search ............... 427/127–132, 427/549, 550, 599, 385.5, 443.2, 444, 402

[56] References Cited

U.S. PATENT DOCUMENTS 4,745,001  5/1988  Miyoshi et al. .................... 427/549
4,844,946  7/1989  Komatsu et al. .................... 427/549
5,268,206  12/1993  Komatsu et al. ................. 427/550 X

FOREIGN PATENT DOCUMENTS

| | | |
|---|---|---|
| 52-84706 | 7/1977 | Japan. |
| 60-76023 | 4/1985 | Japan. |
| 62-175931 | 8/1987 | Japan. |
| 1-144216 | 6/1989 | Japan. |
| 1-292626 | 11/1989 | Japan. |
| 2-23524 | 1/1990 | Japan. |
| 2-130724 | 5/1990 | Japan. |
| 2-132639 | 5/1990 | Japan. |
| 2-132640 | 5/1990 | Japan. |
| 3-34126 | 2/1991 | Japan. |
| 3-41892 | 6/1991 | Japan. |
| 3-41893 | 6/1991 | Japan. |

*Primary Examiner*—Bernard Pianalto
*Attorney, Agent, or Firm*—Oblon, Spivak, McClelland, Maier & Neustadt, P.C.

[57] ABSTRACT

In a method of manufacturing magnetic recording medium, the position and operating condition and the like of an orienting device are determined so that a solvent weight ratio X satisfies $0.7 \leq X \leq 1.0$.

4 Claims, 7 Drawing Sheets

$$b = \frac{d_1 + d_2 + d_3 + \cdots + d_n}{L} = \frac{\sum_{i}^{n} d_i}{L}$$

$b$ = OPENING RATE
$d_i$ = WIDTH OF NOZZLE JET AIR BLOW-OFF SLIT
  (LENGTH IN TRAVELING DIRECTION OF SUPPORT MEMBER) (m)
$L$ = LENGTH (m) ALONG WEB OF AIMED ZONE (DRY ZONE)
$n$ = TOTAL NUMBER OF SLITS FORMED IN AIMED ZONE (DRY ZONE)

DRYING FURNACE
(CONDITION I)

Fig. 8 (b)

(CONDITION II)

Fig. 8 (c)

(CONDITION III)

Fig. 8 (d)

(CONDITION IV)

Fig. 8 (e)

RANGE BY OPTIMIZED EQUATION
(CONDITION V)

METHOD OF MANUFACTURING MAGNETIC RECORDING MEDIUM

BACKGROUND OF THE INVENTION

1. Field of the Invention

The present invention relates to a method of manufacturing a magnetic recording medium.

2. Discussion of the Background Art

In a magnetic recording medium, a magnetic coating material containing a magnetic powder is coated on a support member by a coating apparatus, the support member passes through a dryer to orient the magnetic particles of the coated film by using the magnetic field of a permanent magnet or a solenoid of an orienting device installed in the dryer, and thus, the coated film is dried.

As conventional methods of manufacturing a magnetic recording medium having a high degree of orientation and a high output power, the following methods described in Background Arts 1 to 4 are known.

(Background Art 1) A method is disclosed in which after a coating material is coated by a coating apparatus, until a drying process is completed to eliminate the fluidity of the coated film, orienting devices are continuously installed along a support member convey path (Japanese Unexamined Patent Publication Nos. (JP-A) 62-175931 and 2-23524).

(Background Art 2) A method is disclosed in which a drying process is performed before an orienting operation is performed, a method is disclosed in which a drying process is performed after an orienting operation is performed, and a method is disclosed by combining these methods to each other (Japanese Unexamined Patent Publication Nos. (JP-A) 52-84706, 60-76023, 1-292626, 2-130724, 2-132639, and 3-34126).

(Background Art 3) A method is disclosed in which an amount of light reflected by a coated film coated on a support member is monitored to detect a hardening point of the coated film, and a drying process is controlled such that an orienting operation is performed before the coated film is hardened by monitoring the amount of reflected light (Japanese Examined Patent Publication (JP-B2) No. 3-41893).

(Background Art 4) A method is disclosed in which a degree of dryness in orienting a coated film installed on a support member is regulated by an amount of solvent in the coating film (Japanese Examined Patent Publication (JPB2) No. 3-41892 and Japanese Unexamined Patent Publication (JP-A) Nos. 1-144216 and 2-132640).

However, the above background arts have the following problems.

According to background art 1, sufficient orientation can be obtained, and a coated film is hardened while disturbance of orientation is completely prevented. For this reason, an ideally oriented coated film can be obtained. However, since this method requires a very large number of orienting devices, the method becomes expensive and is inefficient.

Although background art 2 is required as a method for preventing magnetic particles from being at random after orientation, this method lacks controllability and is insufficient. For example, in a case orientation is performed after a drying process is excessively performed in advance, a degree of orientation is degraded.

In background art 3, information that a coated film is hardened can be, indeed, obtained as a necessary condition for controlling the orientation by the drying process. But, even before the coated film is hardened, depending on a degree of dryness, the viscosity of the coated film may be too high to be oriented sufficiently. Namely, sufficient orientation cannot be obtained by monitoring an amount of reflected light.

Background art 4 has a degree of dryness of the coated film on orienting which is regulated by an amount of solvent in a coated film and is based on an idea following a phenomenon. However, although the amount of solvent in the coated film on a traveling support member cannot be easily measured, the method of measuring the amount of solvent is unknown and not practical.

SUMMARY OF THE INVENTION

Accordingly, it is an object of the present invention to manufacture a magnetic recording medium having a high degree of orientation and a high output power under practical and apparent operating conditions determined by an optimizing equation.

The degree of orientation of the magnetic recording medium is set by orientation of magnetic particles caused by a magnetic field and by disturbance of the magnetic particles released from the magnetic field. These are strongly dependent on the balance between the amount of solvent in the coated film and the amount of nonvolatile component. Therefore, in order to optimize an orientation timing, a weight ratio (solvent weight ratio X) of the amount of solvent to the amount of nonvolatile component in the coated film must be regulated in an orienting process. However, an amount of solvent in orientation cannot be easily measured. For this reason, in the present invention, the solvent weight ratio X can be simply calculated from any factors (operation factors, equipment factors, or the like) on the basis of the following simple calculation.

More specifically, in the present invention, there is provided a method of manufacturing a magnetic recording medium in which a magnetic coating material containing a magnetic powder is coated on a support member by a coating apparatus, magnetic particles of the coating material are oriented and the coating material is dried, wherein a relation among an amount of solvent, drying conditions and positions of orienting devices in respective zones and the like satisfies the following equation:

$$0.7 \leq X \leq 1.0$$

where $$X = \frac{W_0 - \sum_{i=0}^{a} \left[ L_i V^{-1} K_i G_i^{ni} \left( \sum_j \omega_{i,j} P_{i,j} \right)^{0.5} \right]}{S}$$

$W_0$: amount of solvent in the coating (kg/m$^2$)

$L_i$: length (m) along the support member in each zone (i)

$L_a$: length (m) along the support member from inlet of a zone in which an aimed orienting device is present to an aimed orienting device $V$: line speed (m/sec) of the support member $K$: ((in a case of a drying process by film traveling)) 6.5×10$^{-5}$ ((in a case of a nozzle jet drying scheme)) 1.0×10$^{-3}$ $n$: ((in the case of the drying process by film traveling)) 0.50 ((in the case of the nozzle jet drying scheme)) 0.78

$G$: corresponding air speed (m/sec) ((in the case of the nozzle jet drying scheme)) product ub of nozzle air speed u (m/sec) and opening rate b (number obtained by dividing total sum of widths (m) of nozzle slits present in the aimed zone by a length along the support member in the aimed zone, wherein the slit width is a length in a traveling direction of the support member) (m/sec) ((in the case of the drying process by film traveling)) V (m/sec)

$c_0$: molar fraction of each solvent component (j) in coating process

P: solvent vapor pressure, determined by dry temperature in each zone and by that of each solvent component (mmHg)

S: amount of nonvolatile component in coating film (kg/m²)

a: a zone in which an aimed orienting device is present i: zone j: solvent type

Further, in the present invention, a coating material is coated on a support member by the coating apparatus to form a plurality of layers in the invention. The zones are formed such that a region in which a coated web travels is divided into a plurality of regions in the longitudinal direction, and numbers are added to the regions. The zone extending from the coating apparatus to the dryer is set to be i=0 th zone. Each chamber in the dryer, wherein at least one of a temperature and an air speed is independently set, is defined as a zone, respectively. When a region which is not for a chamber of the dryer is formed between a chamber and another chamber, one zone is set for each chamber wherein at least one of temperature and air speed is independently set. Serial numbers, i.e., i=1, 2, . . . , are added to the zones determined as described above from a near side of the coating apparatus.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention, in which.

Figure 1:
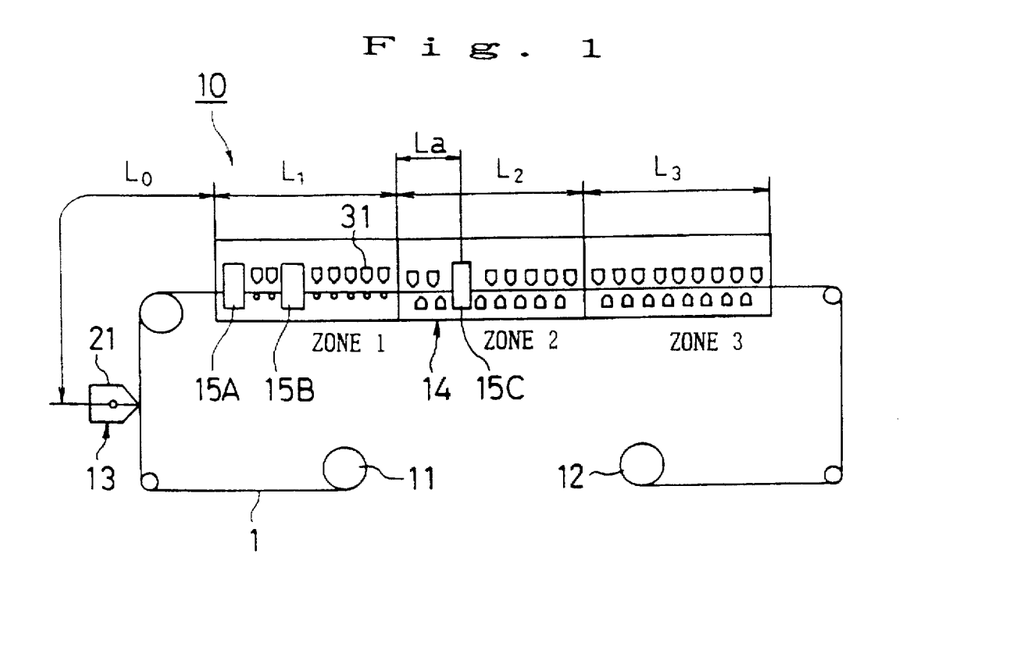
FIG. 1 is a schematic view showing a magnetic recording medium manufacturing apparatus.

DESCRIPTION OF THE PREFERRED EMBODIMENTS (A) Magnetic Recording Medium Manufacturing Apparatus A magnetic recording medium manufacturing apparatus 10, as shown in FIG. 1, has a unwinding portion 11, a winding portion 12, a coating apparatus 13, a dryer 14, and orienting devices 15A-15C. In a process wherein a support member 1 (for example, an elastic sheet or web including plastic, paper, cloth, metal, or the like) continuously travels from the unwinding portion 11 to the winding portion 12, after a magnetic coating material containing a magnetic powder is coated on the support member 1 by the coating apparatus 13, magnetic particles in the coating material are oriented by one or a plurality of orienting devices 15 installed in the dryer 14, and the coating material is then dried by the dryer 14.

Figure 2A:
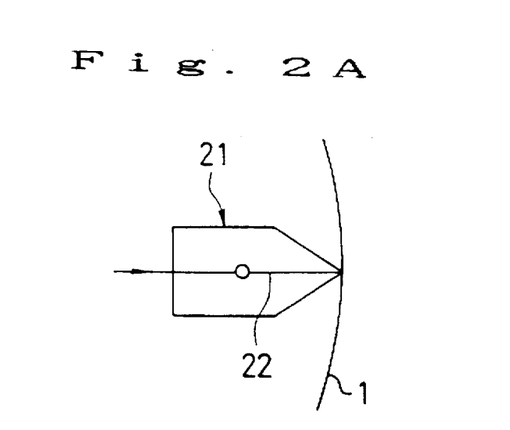
FIGS. 2A and 2B are schematic views showing a coating apparatus.
Figure 2B:
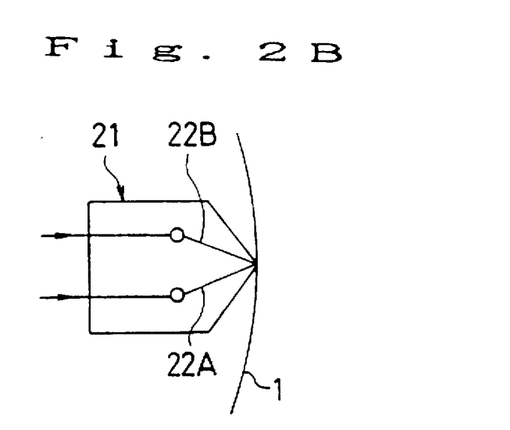

A general coating apparatus can be employed as the coating apparatus 13. For example, an exclusion type die 21 can be used as the coating apparatus 13. As the die 21, (a) a die can be employed in which, as shown in FIG. 2A, a coating material blown off from one coating material blow-off slot 22 is coated and dried on the support member 1, and (b) a die can be employed in which, as shown in FIG. 2B, coating materials blown off from each of two or more coating material blow-off slots 22A, 22B, . . . , which are doubled over each other, are coated on the support member 1, forming a multi-layered structure.

Figure 3:
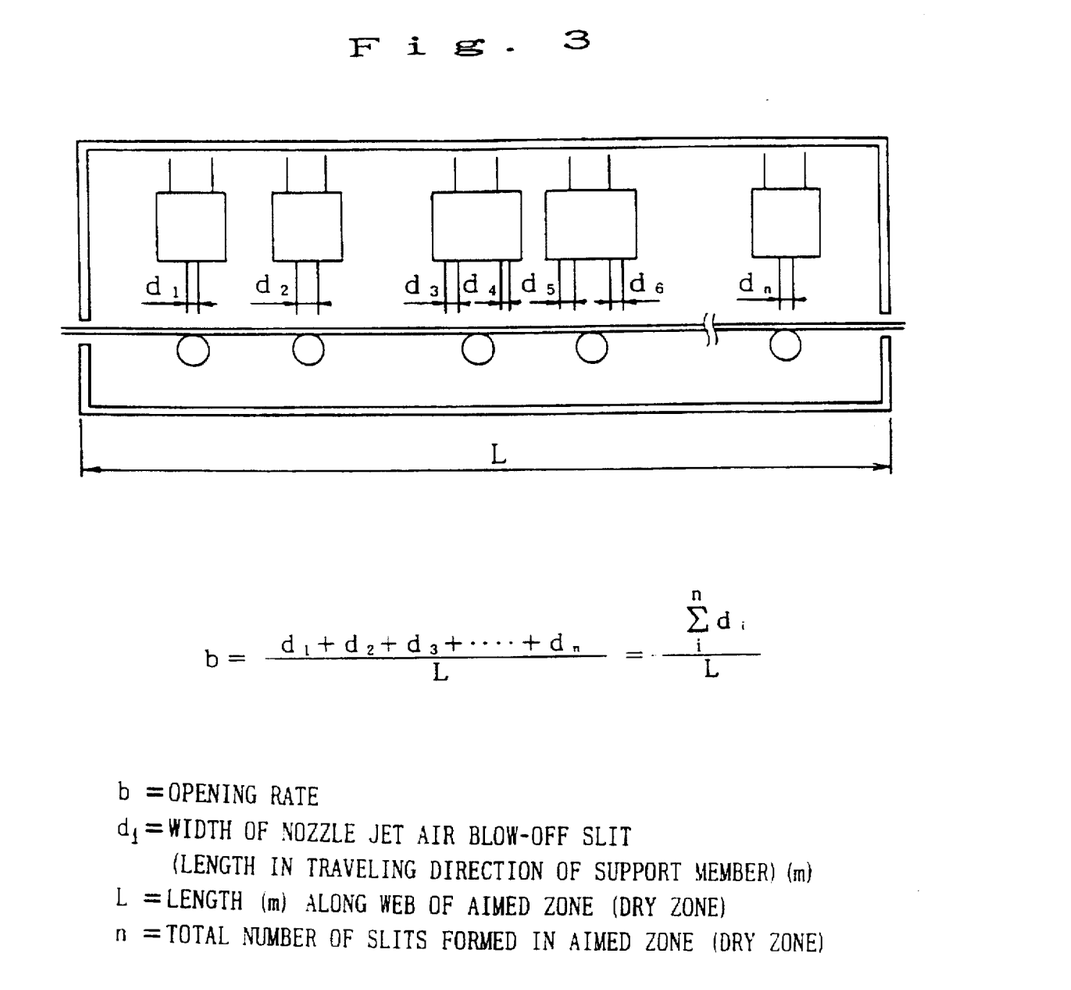
FIG. 3 is a schematic view showing a dryer.

A general dryer can be employed as the dryer 14. For example, a nozzle jet drying scheme having a jet nozzle 31 can be employed as the dryer 14. The dryer 14 shown in FIG. 1 is entirely divided into three zones, i.e., zone 1 to zone 3. The lengths ($L_1$, $L_2$, and $L_3$) of the respective zones and nozzle air speeds (u) in the respective zones are properly set. A total sum of nozzle slit widths $d_i$(m) which are present in aimed zones is given by:

$$\sum_i d_i$$

which is divided by a length L(m) along a support member in the aimed zones, and the obtained number is defined as an opening rate b (see FIG. 3) given by:

$$b = \sum_i d_i / L$$

The slit width is a length in a web traveling direction. In a case a plurality of slits are formed for one nozzle, the total sum of all the slit widths of a nozzle is employed.

General orienting devices can be employed as the orienting devices 15. The orienting devices 15 are installed at proper positions in the dryer 14, i.e., any position in selected zones.

(B) Solvent Weight Ratio and Degree of Orientation in Orienting Process

When the operation conditions of the magnetic recording medium manufacturing apparatus 10 are changed and investigated, a degree of dryness increases in, e.g., the zones 1 and 2 in the dryer 14. In a case the weight ratio of the amount of solvent to the amount of nonvolatile component (solvent weight ratio X) satisfies X<0.7 at the position of the orienting device 15 in the zone 2 (aimed orienting device 15C), the viscosity of the coated film at the position of the orienting device 15 is high. For this reason, a sufficient orientation state cannot be obtained by the orienting device 15. In a case a degree of dryness does not increase in the zones 1 and 2, and the solvent weight ratio X satisfies X>1.0 at the position of the orienting device 15 in the zone 2, a sufficient orientation state can be obtained at the position of the orienting device 15. However, since the solvent weight ratio X is high, after the coated film passes through the orienting device 15, the fluidity of the coated film in zones following the zone 3 is great, and oriented magnetic particles are extremely disturbed. Therefore, the degree of orientation of the obtained coated film is not sufficient.

In contrast to this, when the solvent weight ratio satisfies $0.7 \leq X \leq 1.0$, a sufficient orientation state can be obtained in the orienting device 15 in the zone 2. After the coated film passes through the orienting devices 15, oriented magnetic particles in the zone 3 are disturbed to some extent. However, since the solvent weight ratio X is low after the coated film passes through the orienting devices 15, the disturbance of the magnetic particles is suppressed to a minimum level. As a result, a coated film having a sufficiently high degree of orientation can be obtained.

Operation and equipment factors such as the amount of solvent in coating, the composition of the solvent, a line speed (traveling speed of the support member 1), a drying temperature, a hot air speed, and the position of the orienting device contribute to the solvent weight ratio X at each position in the dryer 14.

(C) Position of Orienting Device

As a condition of an orienting installation position required for obtaining a coated film having a high degree of orientation, at least one orienting device 15 is installed at a position where the condition $0.7 \leq X \leq 1.0$ is satisfied (if at least one orienting device 15 is also installed within the range of $0.7 \leq X \leq 1.0$, a degree of orientation may increase in certain circumstances). For example, when the orienting device 15C in the zone 2 is installed at a position in a proper range which satisfies $0.7 \leq X \leq 1.0$, other orienting devices 15A and 15B may be installed in or out of the proper range.

(D) Calculation of Solvent Weight Ratio X

A solvent weight ratio X at the position of an aimed orienting device is defined in the following manner.

A drying zone in which the aimed orienting device is present is defined as the ath zone (zone a). The amount of solvent left in the aimed orienting device is obtained by subtracting an amount of solvent vaporized from coating $\Delta W_0$ (kg/m$^2$) in a coating process chamber in which a coating apparatus is installed, amounts of solvent vaporized from coating $\Delta W_1, \Delta W_2, \ldots \Delta W_{a-1}$ (kg/m$^2$) in the drying zones 1, 2, ..., a−1, and an amount of solvent $\Delta W_a$ (kg/m$^2$) evaporated from the inlet of the zone to the aimed orienting device in the drying zone a from an amount of solvent $W_0$ (kg/m$^2$) in coating. Thus, X can be calculated by the following equation:

$$X = \frac{W_0 - \sum_{i=0}^{a} \Delta W_i}{S} \quad (1)$$

where $W_0$: amount of solvent in coating film in coating (kg/m$^2$)

$\Delta W_i$: amount of solvent vaporized from coating in zone i such as drying zone (kg/m$^2$)

$\Delta W_0$: amount of solvent vaporized from coating in coating process chamber (kg/m$^2$)

$\Delta W_a$: amount of solvent evaporated from coated film running from inlet of zone to aimed orienting device in orienting zone in which aimed orienting device is present (kg/m$^2$)

S: amount of nonvolatile component in coated film (kg/m$^2$)

The amounts of solvent $\Delta W_0, \Delta W_1, \Delta W_2, \ldots, \Delta W_a$ (kg/m$^2$) evaporated in the respective zones between the coating process chamber and the butt dryer are equal to products RT between a drying rate R (kg/(m$^2$sec)) and passing times T (sec) in the zones. Since the passing time T (sec) can be obtained by dividing a length L(m) along a web in the respective zones by the line speed V (m/sec). $\Delta W$ (kg/m$^2$) can be calculated by the following equation:

$$\Delta W = \frac{RL}{V} \quad (2)$$

where $\Delta W$: amount of solvent vaporized from coating in each zone (kg/m$^2$)

R: drying rate in each zone (kg/(m$^2$sec))

L: length along the support member in each zone (m)

V: line speed (m/sec) of the support member

The drying rate R can be obtained by numerically analyzing the following drying equation and heat balance equations:

$$\frac{dw_{s,i}}{d\theta} = -k_i r_i H_i$$

($W_{s,i}$: amount of solvent (kg/m$^2$); $\theta$: time (sec); $k_i$: drying rate constant; $r_i$: molar fraction; $H_i$: humidity (kg/kg))

$$\frac{dT_f}{d\theta} = \frac{2h(T_a - T_f) - \Sigma \lambda k_i r_i H_i}{c_s w_s + c_b w_b + c_n w_n}$$

($T_f$: coating film temperature (K); $\theta$: time (sec); $T_a$: hot air temperature (K); h: heat transfer coefficient (J/sKm$_2$); $\lambda$: latent heat of vaporization (J/kg); $k_i$: laminar film material movement constant (kg/sm$_2$); $r_i$: molar fraction; $H_i$: humidity (kg/kg); $C_s$ solvent specific heat (J/kgK); $W_s$: solvent weight (kg/m$_2$); $c_s$: solvent specific heat (J/kgK); $W_s$: solvent weight (kg/m$_2$); $c_s$: solvent specific heat (J/kgK); $W_s$: solvent weight (kg/m$_2$))

However, since the simultaneous equation between the drying equation and the heat balance equation cannot be easily solved to calculate the drying rate R, in the present invention, the drying rate R is simplified by the following approximate expression proved by a large number of experiments.

$$R = K G^n P_T^{0.5} \quad (3)$$

where

K: ((in a case of a drying by film traveling)) $6.5 \times 10^{-5}$ ((in a case of a nozzle jet drying scheme)) $1.0 \times 10^{-3}$ n: ((in the case of the drying by film traveling)) 0.50 ((in the case of the nozzle jet drying scheme)) 0.78

G: corresponding air speed (m/sec) ((in the case of the nozzle jet drying scheme)) product ub (m/sec) between nozzle air speed u (m/sec) and opening rate b (number obtained by dividing total sum of widths (m) of nozzle slits present in an aimed zone by a length (m) along the support member in aimed zone, wherein the slit width is a length in a traveling direction of the support member) ((drying by film traveling)) V (m/sec)

$P_T$: solvent vapor pressure (total pressure) (mmHg)

The solvent vapor pressure $P_T$ (mmHg) is obtained so that a total sum of products cP between molar fractions c of the solvent components and vapor pressures P (mmHg) defined by drying temperatures in the respective zones of the respective solvent components are calculated with respect to respective solvent components. In fact, since a solvent component having a high vapor pressure is evaporated first, the solvent composition changes as the coated film is dried. For this reason, the molar fractions c change in each of the zones. However, in order to simplify the molar fractions c, the molar fractions c are approximated by molar fractions $c_0$ in coating with respect to all the zones. Therefore, the total pressure $P_T$ of the solvent vapor pressure is calculated by the following equation:

$$P_T = \sum_j c_{0,j} P_j \tag{4}$$

where $P_T$: solvent vapor pressure (total pressure) (mmHg)
$c_0$: molar fraction in coating of each solvent component
P: vapor pressure determined by drying temperature in each zone of each solvent component (mmHg)

Therefore, when $\Delta W$, R, and $P_{tw}$ in the above equation are substituted in the equation of X, the following equation is obtained:

$$X = \frac{W_0 - \sum_{i=0}^{a} \left[ L_i V^{-1} K_i G_i^{n_i} \left( \sum_j c_{0,j} P_{i,j} \right)^{0.5} \right]}{S} \tag{5}$$

In a multilayered coated film, the sums of weights of respective solvent components in the respective layers are calculated, and the sums are applied to the above equation.

Figure 4:
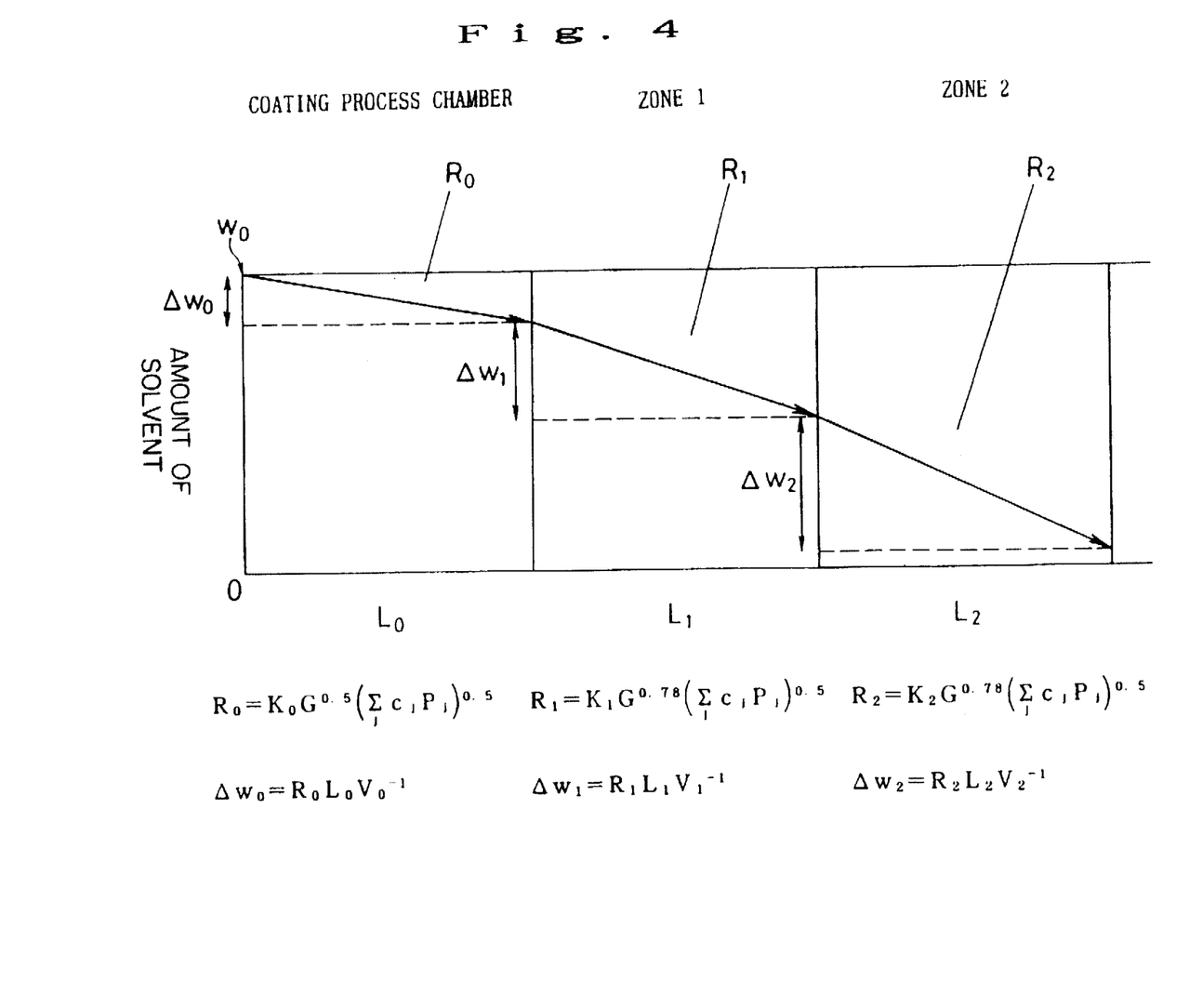
FIG. 4 is a schematic view showing a change in amount of solvent in a coating process chamber and a dryer.

In K, n, and G described above, ((the case of drying by film traveling) means a drying process in which drying by film traveling in the zones in the coating process chamber is dominant, and ((the case of nozzle jet drying scheme)) means a drying process in which a drying scheme by nozzle jet in each of the zones in the dryer is dominant. Assuming that value $KG^n$ is calculated by the drying scheme by film traveling or the drying scheme by nozzle jet, one drying scheme in which a larger value can be obtained is selected between the drying scheme by film traveling or the drying scheme by nozzle jet. Therefore, even if the same equipment and the same position are used, a different drying scheme is dominant in a case the operation conditions such as an air speed and a line speed are changed. R and $\Delta W$ in the respective zones in the coating process chamber and the dryer are as shown in FIG. 4.

EXAMPLES (Example 1)

A coating material in Table 1 was coated on a film under coating process conditions in Table 1 to form a single layer film, and the film was dried under the conditions in Table 2. An orienting device was installed at La=2.9 m in zone 1 in a dryer. A nozzle air speed u in the dryer was changed in the range of 5.7 to 14.9 m/s, a solvent weight ratio X at each air speed u was calculated, and a degree of orientation Sq was measured after completion of a drying operation.

Figure 5:
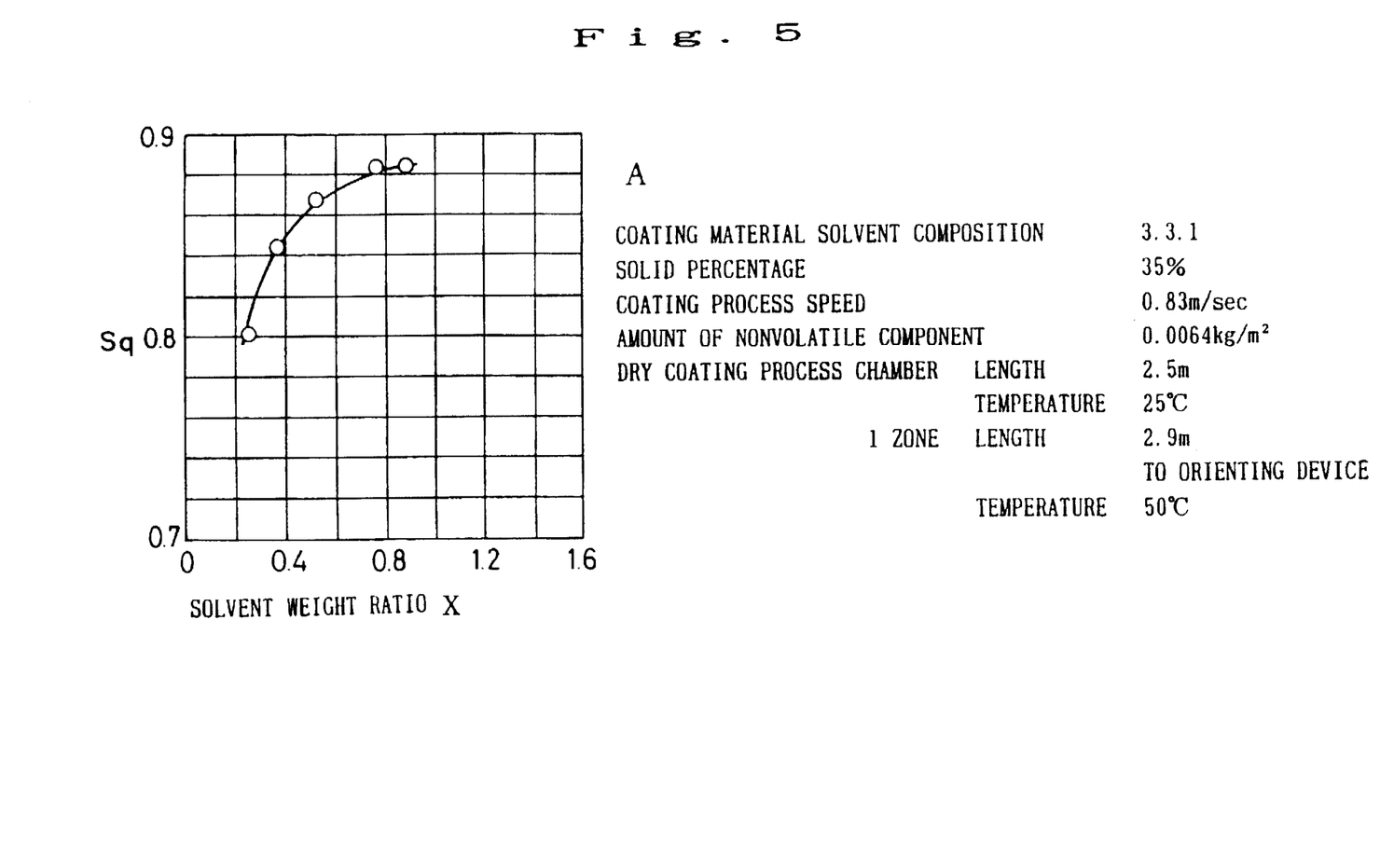
FIG. 5 is a graph showing the relationship between a solvent weight ratio X and a degree of orientation Sq in an orienting process in Example 1.

Thus, the results shown in Table 3 and FIG. 5, were obtained.

(Example 2)

A coating material in Table 1 was coated on a film under coating process conditions to form a single layer of film, and the film was dried under the conditions in Table 2. As an aimed orienting device, an orienting device was installed at La=1.5 m in zone 1 in a dryer. A nozzle air speed u in the dryer was changed in the range of 0 to 29 m/s, a solvent weight ratio X on orienting at each air speed u was calculated, and a degree of orientation Sq was measured after completion of a drying operation. Thus, the results shown in Table 3 and FIG. 6 were obtained.

(Example 3)

A coating material in Table 1 was coated on a film under coating process conditions to form two layers of film, and the film was dried under the conditions in Table 2. An orienting device was installed at La=1.5 m in zone 1 in a dryer. A nozzle air speed u in the dryer was changed in the range of 0 to 28.7 m/s, a solvent weight ratio X on orienting at each air speed u was calculated, and a degree of orientation Sq was measured after completion of a drying operation. Thus, the results shown in Table 3 and FIG. 7 were obtained.

Figure 6:
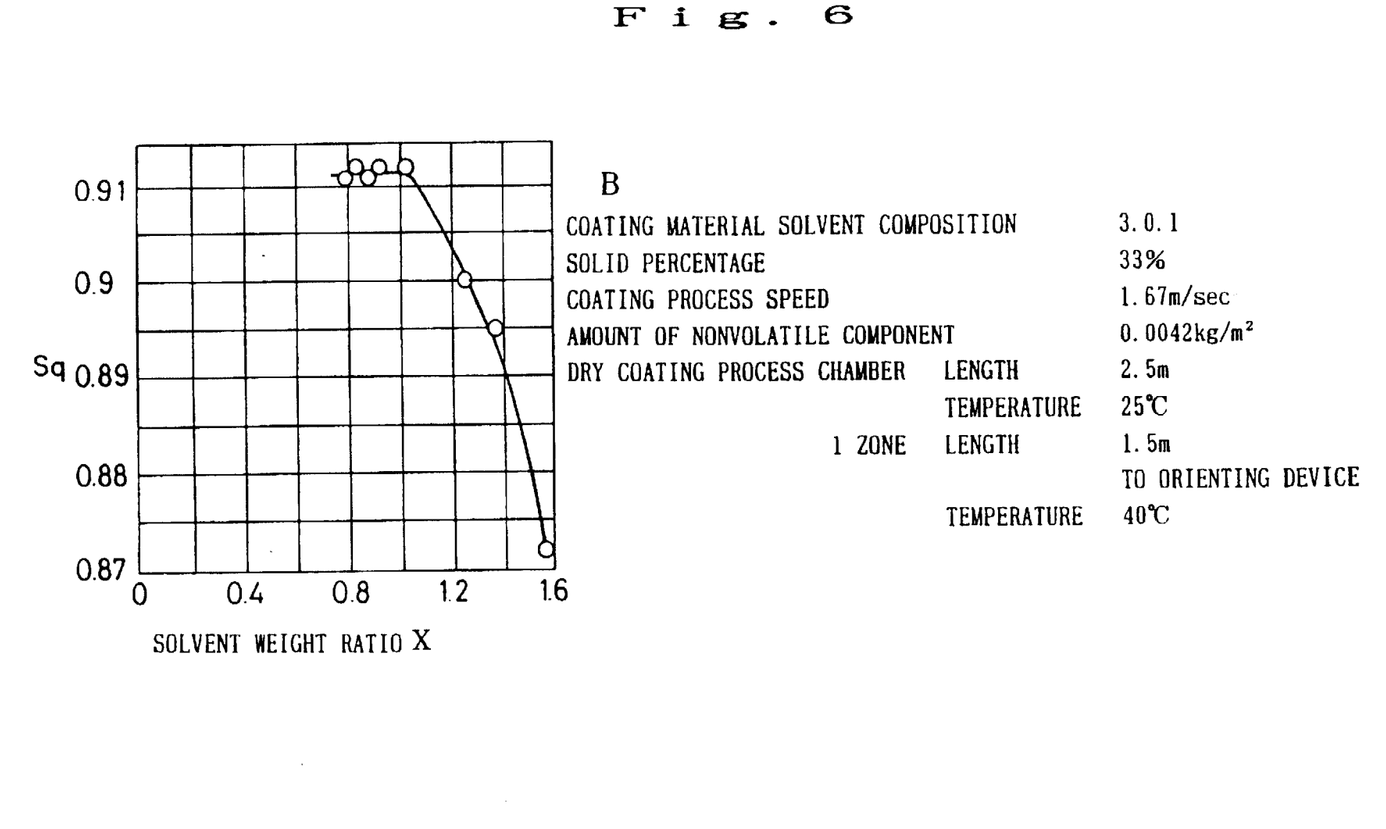
FIG. 6 is a graph showing the relationship between a solvent weight ratio X and a degree of orientation Sq in an orienting process in Example 2.
Figure 7:
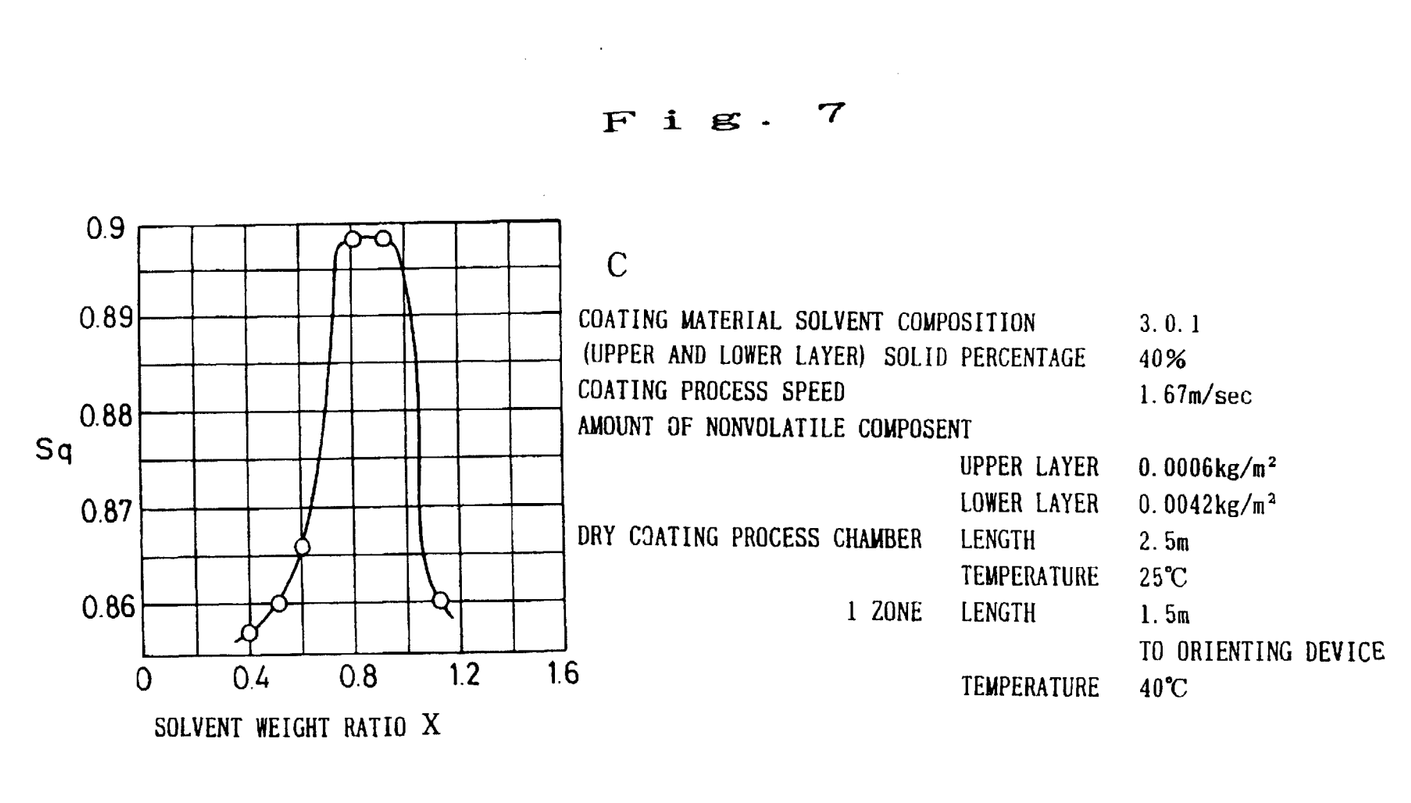
FIG. 7 is a graph showing the relationship between a solvent weight ratio X and a degree of orientation Sq in an orienting process in Example 3.

When the relation between the solvent weight ratios X on orienting and the degrees of orientation Sq described in Table 3 and the graphs in FIGS. 5, 6, and 7 in Examples 1 to 3 satisfies $0.7 \leq X \leq 1.0$, more preferably, $0.75 \leq X \leq 1.0$, it is confirmed that a coated film having a preferable degree of orientation can be obtained.

(Influence of Orienting Device out of Range Calculated by Optimizing equation)

The result of a degree of orientation Sq obtained when an orienting device A is installed within a range calculated by the optimizing equation is shown in Condition II in Table 4. The result of a degree of orientation Sq obtained when an orienting device B is installed on an upstream side in addition to in the range calculated by the optimizing equation is shown in Condition I in Table 4. The result of a degree of orientation Sq obtained when an orienting device B is installed on a downstream side in addition to in the range calculated by the optimizing equation is shown in Condition III in Table 4. The result of a degree of orientation Sq obtained when no orienting device is within the range calculated by the optimizing equation is shown in Conditions IV and V in Table 4. The same experiment conditions as in Examples 1 to 3 are used. But, the air speed conditions are subject to the fact that the value of degree of orientation is a maximum value. The installation positions of the orienting devices under each Conditions I to V are shown in respective FIGS. 8(a), 8(b), 8(c), 8(d) and 8(e).

Figure 8:
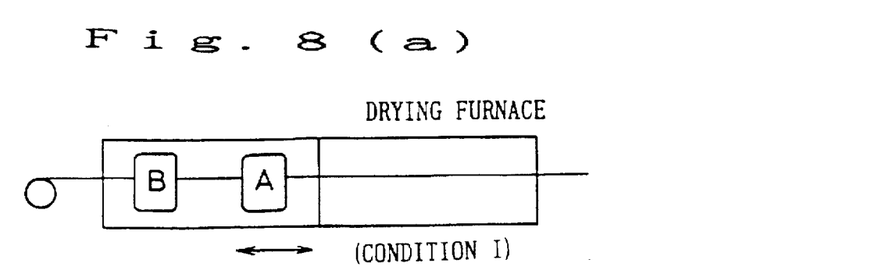
FIGS. 8(a), 8(b), 8(c), 8(d) and 8(e) are schematic views showing the installation positions of orienting devices.

As is apparent from Table 4, an orienting device may be installed out of the range of the present invention, and the degree of orientation Sq under Conditions I and III (see FIGS. 8(a) and 8(c), respectively) is higher than the degree of orientation Sq under Conditions II (see FIG. 8(b)). However, the degrees of orientation Sq under Conditions I, II, and III are conspicuously higher than the degrees of orientation Sq under Conditions IV and V (see FIGS. 8(d) and 8(e), respectively). Therefore, it is understood that an orienting device must be present at least within the range of the present invention.

The molar weights of solvent components (MEK, toluene, and anone) and vapor pressures at each temperature in Examples 1 to 3 are shown in Tables 5 and 6, respectively.

More specifically, in the orienting/drying method of the magnetic recording medium according to the present invention, conditions are defined on the basis of the mechanism of orientation by the correlation of the balance between a solvent weight and the weight of a nonvolatile component in an orienting operation with the orienting characteristics. For this reason, a preferable degree of orientation can be obtained, and an equation is defined so that the design and operation conditions of equipment can be realized. Therefore, a magnetic recording medium having a high output power can be obtained.

As has been described above, according to the present invention, under concrete and apparent operation conditions, a magnetic recording medium having a high degree of orientation and a high output power can be manufactured.

While the preferred embodiments of the invention have been described in detail with reference to the drawings, they are by no means limitative, and various changes and modifications are possible without departing from the scope and spirit of the invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above but should be understood to include all possible embodiments which can be embodied within a scope encompassed and equivalents thereof with respect to the feature set out in the appended claims.

TABLE 1

| | Symbol | Unit | Example 1 | Example 2 | Example 3 |
|---|---|---|---|---|---|
| Coating Material | | | | | |
| Solvent Composition (MEK:Toluene:Anone) | — | — | 3:3:1 | 3:0:1 | Upper Layer 3:0:1 Lower Layer 3:0:1 |
| Solid Percentage | — | % | 35 | 33 | Upper Layer 40 Lower Layer 40 |

TABLE 1-continued

| | | Symbol | Unit | Example 1 | Example 2 | Example 3 |
|---|---|---|---|---|---|---|
| Coating Process | | | | | | |
| Speed | | V | m/s | 0.833 | 1.67 | 1.67 |
| Amount of Nonvolatile Component | | S | kg/m² | 0.0064 | 0.0042 | 0.0048 Upper Layer 0.0006 Lower Layer 0.0042 |
| Amount of Solvent in Coating | MEK | — | kg/m² | 0.00513 | 0.00640 | 0.00536 |
| | Toluene | — | kg/m² | 0.00513 | 0 | 0 |
| | Anone | — | kg/m² | 0.00171 | 0.00213 | 0.00179 |
| | Total | Wo | kg/m² | 0.0120 | 0.00853 | 0.00714 |
| Molar Fraction of Solvent in Coating | MEK | $c_{0,0}$ | — | 0.493 | 0.804 | 0.804 |
| | Toluene | $c_{0,1}$ | — | 0.386 | 0 | 0 |
| | Anone | $c_{0,2}$ | — | 0.121 | 0.196 | 0.196 |

TABLE 2

| | | Symbol | Unit | Example 1 | Example 2 | Example 3 |
|---|---|---|---|---|---|---|
| Drying | | | | | | |
| Coating Process Chamber | | | | | | |
| Length | | $L_0$ | m | 2.5 | 2.5 | 2.5 |
| Temperature | | — | °C. | 25 | 25 | 25 |
| Vapor Pressure | MEK | $P_{0,0}$ | mmHg | 94.1 | 94.1 | 94.1 |
| | Toluene | $P_{0,1}$ | mmHg | 28.7 | 0 | 0 |
| | Anone | $P_{0,2}$ | mmHg | 4.6 | 4.6 | 4.6 |
| Vapor Pressure (Partial Pressure) | MEK | $c_{0,0}P_{0,0}$ | mmHg | 46.4 | 75.6 | 75.6 |
| | Toluene | $c_{0,1}P_{0,1}$ | mmHg | 11.1 | — | — |
| | Anone | $c_{0,2}P_{0,2}$ | mmHg | 0.558 | 0.909 | 0.909 |
| Corresponding Air Speed | | $G_0(=V)$ | m/s | 0.833 | 0.833 | 0.833 |
| K | | $K_0$ | — | $6.5 \times 10^{-5}$ | $6.5 \times 10^{-5}$ | $6.5 \times 10^{-5}$ |
| n | | $n_0$ | — | 0.5 | 0.5 | 0.5 |
| Zone 1 | | | | | | |
| Length (To Orienting Device) | | $L_1$ | m | 2.9 | 1.5 | 1.5 |
| Temperature | | — | °C. | 50 | 40 | 40 |
| Vapor Pressure | MEK | $P_{1,0}$ | mmHg | 269.5 | 181.0 | 181.0 |
| | Toluene | $P_{1,1}$ | mmHg | 93.2 | — | — |
| | Anone | $P_{1,2}$ | mmHg | 17.7 | 10.7 | 10.7 |
| Vapor Pressure (Partial Pressure) | MEK | $c_{0,0}P_{1,0}$ | mmHg | 46.4 | 145.4 | 145.4 |
| | Toluene | $c_{0,1}P_{1,1}$ | mmHg | 11.1 | 0 | 0 |
| | Anone | $c_{0,2}P_{1,2}$ | mmHg | 0.558 | 2.1 | 2.1 |
| Nozzle Slit Width | | $d_1$ | mm | 3 | 3 | 3 |
| Nozzle Pitch | | $d_2$ | mm | 300 | 300 | 300 |
| Openning | | $b(=d_1/d_2)$ | — | 0.01 | 0.01 | 0.01 |

TABLE 2-continued

|  | Symbol | Unit | Example 1 | Example 2 | Example 3 |
|---|---|---|---|---|---|
| Nozzle Jet Air Speed | u | m/s | 5.7–14.9 | 9.0–29.0 | 9.1–28.7 |
| Corresponding Air Speed | $G_1(=bu)$ | m/s | 0.057–0.149 | 0.09–0.29 | 0.091–0.287 |
| K | $K_1$ | — | $1.0 \times 10^{-3}$ | $1.0 \times 10^{-3}$ | $1.0 \times 10^{-3}$ |
| n | $n_1$ | — | 0.78 | 0.78 | 0.78 |
| a | — | — | 1 | 1 | 1 |
| $K_1 G_1{}^{a1}$ |  |  |  |  |  |
| When assuming that drying performed by film travelling is dominant |  |  | $5.9 \times 10^{-5}$ | $8.4 \times 10^{-5}$ | $8.4 \times 10^{-5}$ |
| When assuming that drying performed by nozzle jet air is dominant (*) |  |  | $1.1 \times 10^{-4}$ | $1.5 \times 10^{-4}$ | $1.5 \times 10^{-4}$ |

(*) Air speed is calculated by using minimum air speed of air speed conditions except for zero air speed in examples.

TABLE 3

(Example 1)

| Air Speed u(m/s) | 5.7 | 7.0 | 11.1 | 9.5 | 12.5 | 13.8 | 14.9 |
|---|---|---|---|---|---|---|---|
| Solvent Weight Ratio X (Orienting Device Position Within Range) | 0.886 | 0.756 | 0.373 | 0.518 | 0.250 | 0.142 | 0.045 |
| Degree of Orientation Sq | 0.884 | 0.884 | 0.843 | 0.867 | 0.802 | 0.764 | 0.729 |

(Example 2)

| Air Speed u(m/s) | 9 | 13 | 20 | 24 | 26 | 27 | 29 | 0 |
|---|---|---|---|---|---|---|---|---|
| Solvent Weight Ratio X (Orienting Device Position Within Range) | 1.37 | 1.24 | 1.02 | 0.91 | 0.87 | 0.82 | 0.79 | 1.55 |
| Degree of Orientation Sq | 0.895 | 0.900 | 0.912 | 0.912 | 0.911 | 0.912 | 0.911 | 0.872 |

(Example 3)

| Air Speed u(m/s) | 0 | 9.1 | 12.8 | 20.3 | 24.0 | 28.7 |
|---|---|---|---|---|---|---|
| Solvent Weight Ratio X (Orienting Device Position Within Range) | 1.08 | 0.92 | 0.81 | 0.61 | 0.51 | 0.40 |
| Degree of Orientation Sq | 0.86 | 0.898 | 0.898 | 0.866 | 0.86 | 0.857 |

TABLE 4

| | Condition for Installing Orienting Device | | | | |
|---|---|---|---|---|---|
| | I | II | III | IV | V |
| Example 1 | 0.891 | 0.884 | 0.889 | 0.805 | 0.837 |
| Example 2 | 0.918 | 0.912 | 0.915 | 0.782 | 0.861 |
| Example 3 | 0.903 | 0.898 | 0.902 | 0.829 | 0.852 |

I: Within range and out of range by optimized equation (upstream side)
II: Within range by optimized equation
III: Within range and out of range by optimized equation (downstream side)
IV: Out of range by optimized equation
V: Out of range by optimized equation

TABLE 5

| Material | Molar Weight |
|---|---|
| MEK | 72 |
| Toluene | 92 |
| Anone | 98.2 |

TABLE 6

| Temperature | Vapor Pressure (mmHg) | | |
|---|---|---|---|
| (°C.) | MEK | Toluene | Anone |
| 25 | 94.1 | 28.7 | 4.6 |
| 40 | 181.0 | 59.8 | 10.7 |
| 50 | 269.5 | 93.2 | 17.7 |

What is claimed is:

1. A method of manufacturing a magnetic recording medium comprising the steps of:

applying a magnetic coating material containing a magnetic powder with magnetic particles or a support member by a coating apparatus;

orienting and drying the magnetic particles of the coating material, wherein a relation among an amount of solvent, drying conditions, and positions of orienting devices in respective zones during the step of orienting and drying the magnetic particles satisfies the following equation:

$$0.7 \leq X \leq 1.0$$

where $$X = \frac{W_o - \sum_{i=0}^{a} [L_i V^{-1} K_i G_i^{ni}] \left( \sum_j c_{o,j} P_{i,j} \right)^{0.5}}{S}$$

$W_O$: amount of solvent in the coating (kg/m$^2$)

$L_i$: length (m) along the support member in each zone (i)

$L_a$: length (m) along the support member from an inlet of a zone in which an aimed orienting device is present to an aimed orienting device V: line speed (m/sec) of the support member K: ((in a case of a drying process by film traveling)) $6.5 \times 10^{-5}$ ((in a case of a nozzle jet drying scheme)) $1.0 \times 10^{-3}$ n: ((in the case of the drying process by film traveling)) 0.50 ((in the case of the nozzle jet drying scheme)) 0.78

G: corresponding air speed (m/sec) ((in the case of the nozzle jet drying scheme)) product ub of nozzle air speed u (m/sec) and an opening rate b (number obtained by dividing total sum of widths (m) of nozzle slits present in the aimed zone by a length along the support member in the aimed zone, wherein the slit width is a length in a traveling direction of the support member)(m/sec) ((in the case of the drying process by film traveling)) V (m/sec)

$c_o$: molar fraction of each solvent component (j) in coating process

P: solvent vapor pressure (mmHg), determined by dry temperature in each zone and by that of each solvent component (mmHg)

S: amount of nonvolatile component in coating film (kg/m$^2$)

a: a zone in which an aimed orienting device is present i: zone j: solvent type.

2. A method of manufacturing a magnetic recording medium according to claim 1, wherein in the step of applying the magnetic coating material, the magnetic coating material is coated on the support member by said coating apparatus to form a plurality of layers.

3. A method for controlling an apparatus for manufacturing a magnetic recording medium comprising a coating apparatus coating a magnetic coating material comprising a magnetic powder with magnetic particles on a support member and a dryer including orienting devices and drying devices for respectively orienting and drying said magnetic particles of said coating material, comprising the steps of:

determining an amount of solvent in said coating (kg/m$^2$) $W_O$;

determining an amount of nonvolatile component in said coating (kg/m$^2$)S; and controlling said dryer to satisfy the following equation based on $W_o$ and S:

$$0.7 \leq X \leq 1.0$$

where $$X = \frac{W_o - \sum_{i=0}^{a} [L_i V^{-1} K_i G_i^{ni}] \left( \sum_j c_{o,j} P_{i,j} \right)^{0.5}}{S}$$

$L_i$: length (m) along the support member in each zone (i)

$L_a$: length (m) along the support member from an inlet of a zone in which an aimed orienting device is present to an aimed orienting device V: line speed (m/sec) of the support member K: ((in a case of a drying process by film traveling)) $6.5 \times 10^{-5}$ ((in a case of a nozzle jet drying scheme)) $1.0 \times 10^{-3}$ n: ((in the case of the drying process by film traveling)) 0.50 ((in the case of the nozzle jet drying scheme)) 0.78

G: corresponding air speed (m/sec) ((in the case of the nozzle jet drying scheme)) product ub of nozzle air speed u (m/sec) and an opening rate b (number obtained by dividing total sum of widths (m) of nozzle slits present in the aimed zone by a length along the support member in the aimed zone, wherein the slit width is a length in a traveling direction of the support member)(m/sec) ((in the case of the drying process by film traveling)) V (m/sec)

$c_o$: molar fraction of each solvent component (j) in coating process

P: solvent vapor pressure (mmHg), determined by dry temperature in each zone and by that of each solvent component (mmHg)

a: a zone in which an aimed orienting device is present i: zone j: solvent type.

4. The method for controlling an apparatus for manufacturing a magnetic recording medium according to claim 3, further comprising the step of controlling the coating apparatus to form a plurality of layers on the support member.

* * * * *